UNITED STATES PATENT OFFICE.

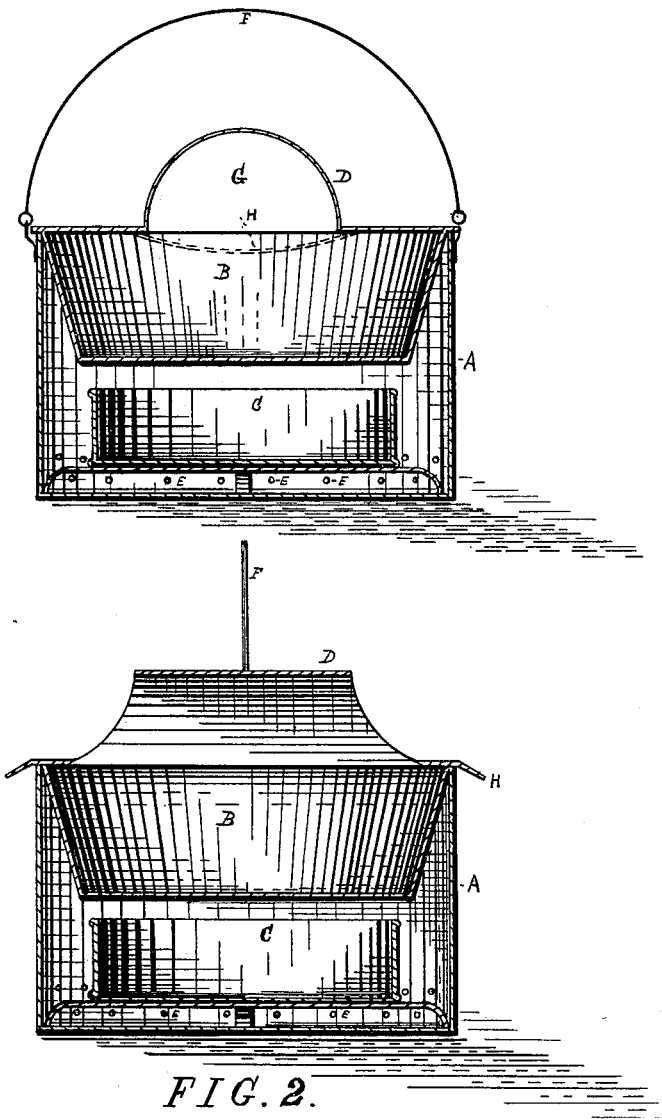

SELAH ALONZO BACON, OF DAMASCUS, HENRY COUNTY, OHIO.

DEVICE FOR WATERING POULTRY.

SPECIFICATION forming part of Letters Patent No. 386,865, dated July 31, 1888.

Application filed December 15, 1887. Serial No. 258,022. (No model.)

*To all whom it may concern:*

Be it known that I, SELAH ALONZO BACON, a citizen of the United States, residing in the township of Damascus, in the county of Henry and State of Ohio, (with post-office address at Grand Rapids, Wood county, Ohio,) have invented a new and useful Poultry-Waterer, and called the "New Non-Freezing Poultry-Waterer," of which the following is a specification.

My invention relates to an improved device for watering poultry and for protecting the water provided for that purpose from dust and dirt at all seasons of the year and from frost in the winter season; and the objects of my improvements are, first, to provide a suitable water-receptacle (which is adapted in form and height for a fowl to take its drink therefrom) with means, in the form of a shield, for protecting its interior parts, wherein the said liquid is stored, from an undue influx of dust and dirt, caused by the well-known untidy and unclean habits of said fowls; second, to provide such a device with means of prevention against frost in winter, to the end that the contained water may be preserved in a liquid state, though it be exposed to the action of severe frosts by being left in the open atmosphere; third, to construct such a device in a portable form. I accomplish these objects by the device illustrated in the accompanying drawings, in which—

Figure 1 is a vertical section of the entire device cut on a line at one side of the vertical plane of the bail F in said figure. Fig. 2 is a vertical section of the entire device cut through its vertical center in a plane at a right angle to the view shown in Fig. 1.

Similar letters refer to similar parts throughout the several views.

Referring to the drawings, A represents a case, which is preferably circular in form and is provided with a bail, F. In these particulars this device resembles an ordinary pail.

B represents a liquid-receptacle, and is preferably made in the form of an inverted truncated cone, forming an air-space between the interior of the said case A and the exterior of the said liquid-receptacle B. At H is a cover which extends over a portion of the horizontal plane of the top of the said liquid-receptacle, flanging over and extending radially beyond the sides of the case A, and is bent downward into a curved form, as shown by the dotted lines representing a part of said flange, below the opening G in Fig. 1 at H. This cover is also (as a part thereof) provided with a shield, D, its preferable form being that shown in the drawings, and is in form an arch, transversely cut sloping at its ends, forming an opening, G, at either end thereof, the better to adapt it to the use for which it is intended, as will be hereinafter fully explained.

C represents a heating-pan, which is preferably constructed as shown in the drawings, though its form and relative size might be somewhat changed and serve as good a purpose. This pan is circular in form and somewhat smaller in diameter than the inner diameter of the case A, and is supported upon legs to elevate it somewhat above the bottom of the said case, for the purpose of forming an air-space between the said heating-pan and case. The case has perforations in its sides at its lower extremity, (shown in the drawings,) through which air is admitted to support combustion. This device consists, therefore, of three separate detachable parts—the case A, the liquid-receptacle B, and the heating-pan C, and the said parts B and C are vertically removable from the said case A—and the whole is adapted to be operated as follows:

The liquid-receptacle is removed from the case by raising it vertically and fuel for heating placed in the pan C and ignited in the ordinary manner. This fuel is preferably of a concentrated form, such as ordinary wood charcoal; but common wood reduced to small pieces, or any suitable fuel, may be used. The combustion of the said fuel is desirably slow, to the end that a small quantity may serve for a long period, as only a very limited heat is required to effect the desired result—namely, that of keeping the liquid in the pan just above the congealing-point. Through the perforations around the base of the case A the necessary air for the support of the said combustion is furnished from the outside atmosphere. The liquid-receptacle is now filled with water and replaced in position, as shown in the drawings, when the air within the case and surrounding the liquid-receptacle will, by the consuming fuel in the pan, be heated and will impart its caloric to the water in said pan, which will thereby be kept from congealing. In consequence of the liquid-receptacle fitting loosely into the case A, enough air will escape between the two to establish the necessary circulation of air through the perforations in the base of the case A. The consumption of the fuel will, in consequence, be very slow and the congealing of the water in the pan stayed for a long period of time, or as long as the burning fuel is maintained.

A fowl desiring to take water carries its head through the opening G, which opening may be of any desirable size, but should be as small as is consistent with its best use and results, the principal of which is the protection of the interior of the receptacle B from the influx of dirt, dust, and snow.

The flange H extends entirely around the top of the receptacle B, and is preferably inclined downward, as shown in the drawings, and should be somewhat wider opposite the openings G, and is preferably at these points curved downward, as shown by the dotted lines in Fig. 1, its office being to protect the inside of the case A from rain and snow and from drippings raised by the fowls in drinking.

The bail F serves as a handle for transporting the device from place to place and renders it more complete and portable.

Having described my invention, what I claim as new, and desire to secure by Letters Patent, is—

The case A, heating-pan C, and liquid-receptacle B, provided with a superimposed open-ended shield, substantially as shown and described.

SELAH ALONZO BACON.

Witnesses:
J. C. BUCKLIN,
J. M. ANTHONY.